Sept. 20, 1971    J. D. MOYER    3,605,449
PATTERN MECHANISM FOR KNITTING MACHINES
Filed Oct. 6, 1969    2 Sheets-Sheet 1
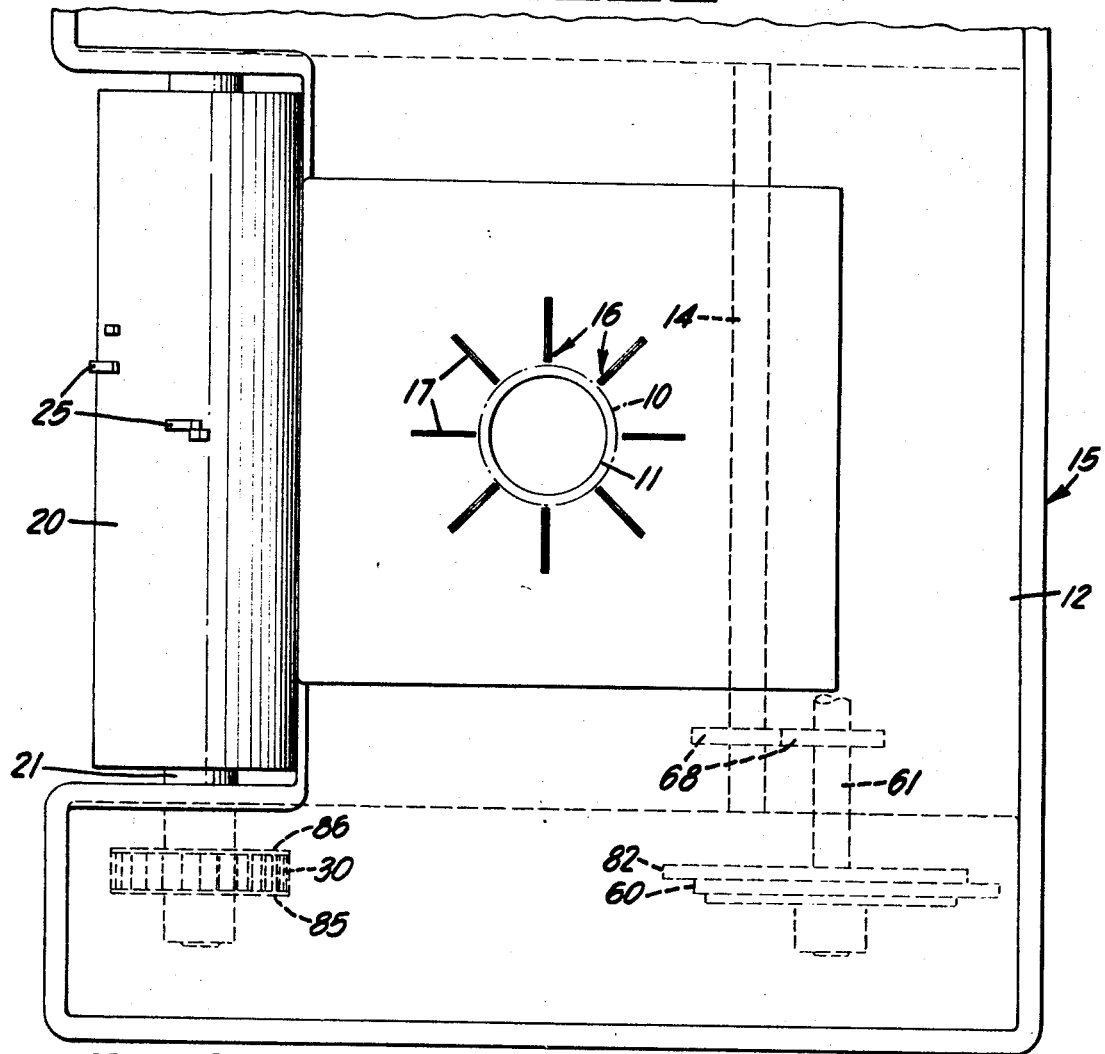
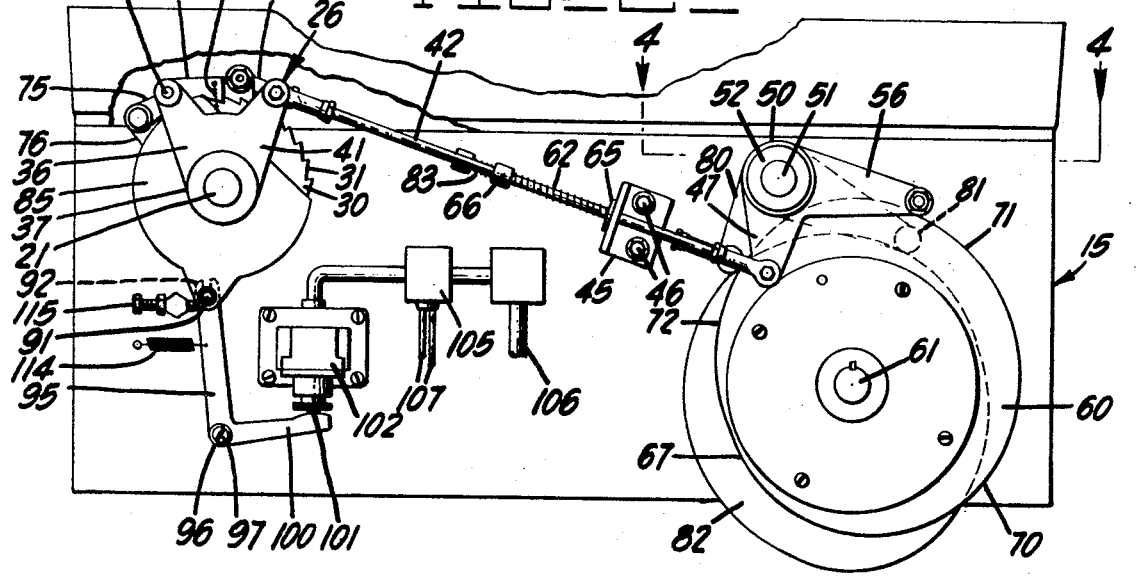

Sept. 20, 1971  J. D. MOYER  3,605,449
PATTERN MECHANISM FOR KNITTING MACHINES
Filed Oct. 6, 1969  2 Sheets-Sheet 2
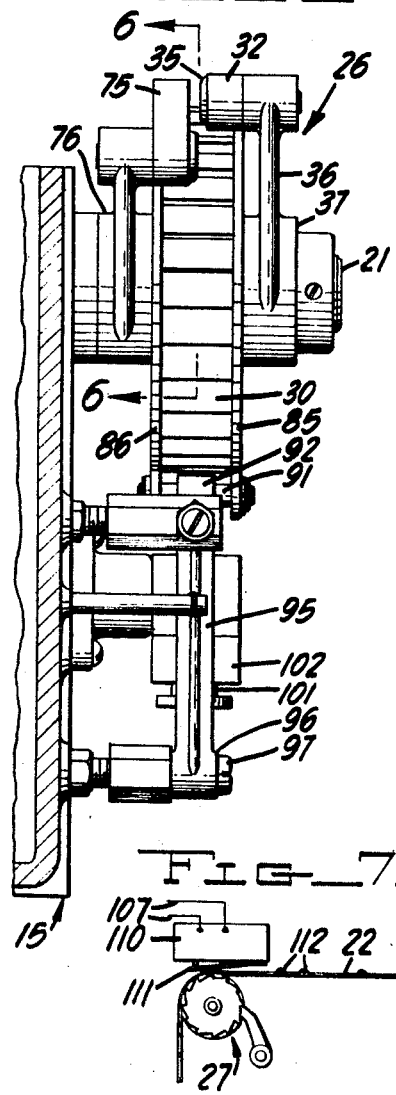
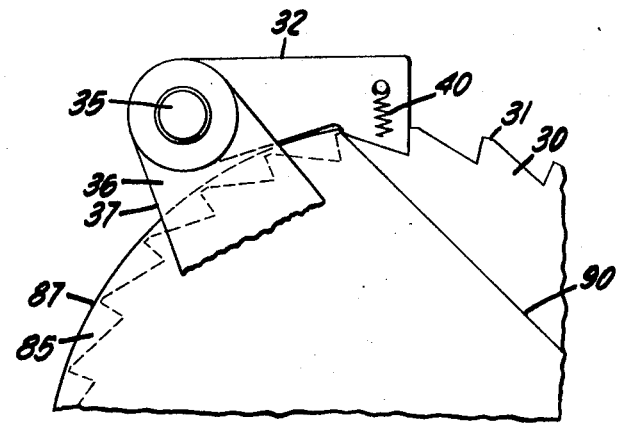
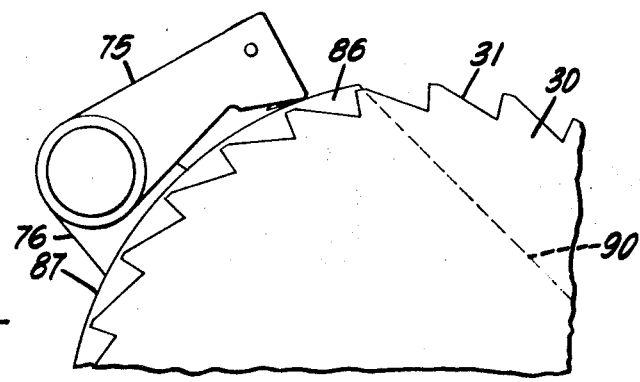
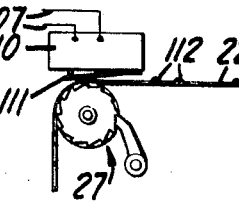
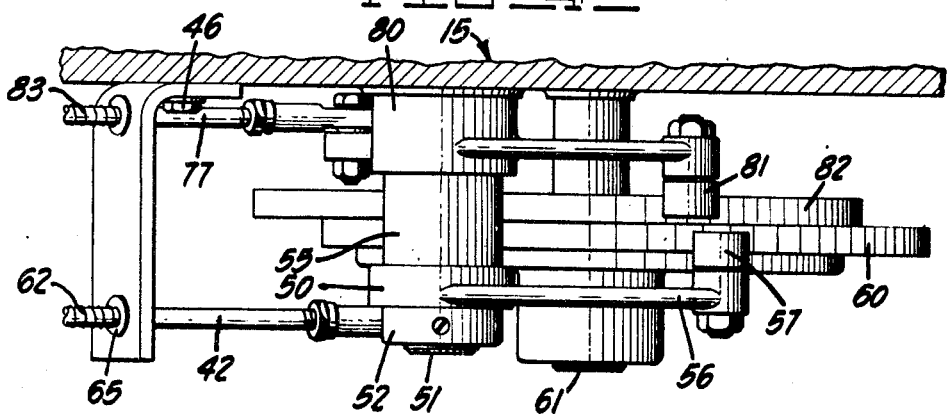

United States Patent Office 3,605,449
Patented Sept. 20, 1971

3,605,449
PATTERN MECHANISM FOR KNITTING MACHINES
James D. Moyer, Wyomissing, Pa., assignor to North American Rockwell Corporation, Pittsburgh, Pa.
Filed Oct. 6, 1969, Ser. No. 864,140
Int. Cl. D04b *15/66*
U.S. Cl. 66—154
8 Claims

ABSTRACT OF THE DISCLOSURE

Pattern mechanism for a circular knitting machine, the pattern mechanism including a cam drum, first and second pawls for indexing the cam drum in steps of equal extent, and means for controlling the operation of the pawls whereby both pawls may be operated successively to index the cam drum during each rotation of a pair of rotations of the needle cylinder of the machine, or one of the pawls may be operated to index the cam drum in only one of a pair of cylinder rotations and the other of the pawls may be operated to index the cam drum in only the other of a pair of cylinder rotations.

BACKGROUND OF THE INVENTION

Conventionally circular knitting machines are provided with a cam drum having cam bits for controlling the operation of the various mechanisms of the machine, indexing means including a main pawl and ratchet for indexing the cam drum and means for controlling the active and inactive positions of the pawl. The pawl controlling means is in turn controlled by riser portions on the links of the pattern chain of the machine. In one form of operating mechanism for the cam drum, such as that shown in U.S. Pat. No. 2,436,468, the pawl is operated through indexing and resetting movements during a pair of cylinder rotations with the indexing movement occurring during the first rotation and a first portion of the second rotation of the pair and the resetting movement occurring in the last portion of the second rotation of the pair. The active position of the pawl is controlled by risers on the links of the chain, which is also indexed during a pair of cylinder rotations, to index the cam drum during a complete indexing movement of the pawl or to index the cam drum in the portion of the indexing movement of the pawl occurring in either the first or second rotations of the pair of cylinder rotations. The spacing of the teeth of the ratchet associated with the pawl is also varied to determine the extent of the indexing movements of the cam drum during the complete and partial indexing movements of the pawl and the indexing movements of the cam drum are in turn correlated with the length of the cam bits on the cam drum to determine the portion of the first or second cylinder rotations of the pair in which a machine operation is to be instituted.

In another form of operating mechanism for the cam drum such as that shown in U.S. Pat. No. 3,169,384, the ratchet is provided with equally spaced teeth and the main pawl is operated through indexing and resetting movements during four rotations of the needle cylinder of the machine with the indexing portion of the pawl movement occurring during the first two cylinder rotations and the resetting movement of the pawl occurring in the last two cylinder rotations. The mechanism of this patent also includes an auxiliary pawl which cooperates with one or more toothed members on the main ratchet to index the cam drum in one or more steps of less extent than the indexing steps provided by the main pawl. The toothed members are moved into the path of the auxiliary pawl during an indexing move of the cam drum by the main indexing pawl and the auxiliary pawl is timed to index the cam drum to institute a machine operation in only the third rotation of the four rotation cycle of the needle cylinder. In order to institute an operation of a mechanism in a particular portion of one or the other of the first two cylinder rotations during each main indexing move of the cam drum or in the third rotation of the four rotation cycle of the machine during the auxiliary indexing moves of the cam drum, the main and auxiliary moves must be correlated with the length of the cam bit provided on the cam drum to institute the machine operation.

The instant invention has for its principal object the provision of means for indexing the main cam drum of a circular knitting machine in steps of equal extent and of control means for the indexing means whereby the indexing means is operative to index the cam drum in single steps in each of a pair of rotations of the needle cylinder of the machine or the indexing means is operative to index the cam drum a single step in either one or the other cylinder rotation of the pair.

SUMMARY OF THE INVENTION

Briefly summarized the invention resides in the provision of means for indexing the cam drum of a circular knitting machine including a ratchet having equally spaced teeth, first and second pawls acting on the teeth of the ratchet, first and second cams for operating the pawls to index the ratchet and cam drum in single tooth indexing movements and means for controlling the active and inactive positions of the pawls. The cams are operated through complete rotative cycles during a pair of sequential rotations of the needle cylinder of the machine and the cams are arranged so that one cam operates its associated pawl to index the cam drum in one of the cylinder rotations of the pair and the other cam operates its associates pawl to index the cam drum in the other cylinder rotation of the pair. The control means is adapted to activate the pawls for successive operation in the pair of cylinder rotations or to activate each pawl for operation only in its associated cylinder rotation of the pair.

BRIEF DESCRIPTION OF THE DRAWINGS

FIG. 1 is a schematic top plan view of a portion of a circular knitting machine having mechanism according to the invention incorporated therein;

FIG. 2 is an elevation view of a portion of the mechanism of FIG. 1;

FIG. 3 is a view on an enlarged scale as viewed from the left of FIG. 2;

FIG. 4 is a view on an enlarged scale taken in the direction of the arrows 4—4 of FIG. 2;

FIG. 5 is a view of a portion of the mechanism of FIG. 3 as viewed from the right of FIG. 3;

FIG. 6 is a view taken on the line and in the direction of the arrows 6—6 of FIG. 3; and FIG. 7 is a schematic view of a pattern mechanism of the machine for controlling the operation of the mechanism of the invention.

DESCRIPTION OF THE PREFERRED EMBODIMENT

Referring to FIG. 1 of the drawings there is shown a portion of a circular knitting machine adapted for rotary operation to form tubular fabrics such as stockings, the machine including a usual circle of needles, indicated at 10, which are slidably mounted in slots in a cylinder 11 mounted for rotation on a plate member 12 forming a part of a framework 15 of the machine. The cylinder 11 is rotated by gearing (not shown) from a drive shaft 14 in a conventional manner. The machine has a plurality of knitting stations 16 each of which is provided with yarn fingers 17 for feeding yarns to the needles and sinkers and cam means (not shown) for operating the needles and sinkers in forming courses of the stocking fabrics. Also provided in the machine is a cam drum 20 carried on a shaft 21 rotatably mounted in the framework 15 and a pattern chain or like member, indicated at 22 in FIG. 7. The cam drum 20 is provided with usual circumferential lines or rows of cam members or bits 25 for controlling the operating mechanisms of the machine and the cam drum is adapted to be indexed in steps through a complete rotation by mechanism 26 in a manner hereinafter set forth. The chain 22 is adapted to be indexed by pawl and ratchet means, indicated at 27 in FIG. 7, in a pattern selecting step during each rotation of the needle cylinder 11.

The mechanism 26 for indexing the cam drum 20, in accordance with the instant invention, includes a ratchet 30 secured to the shaft 21 adjacent one end thereof (FIGS. 1 and 2) the ratchet having a plurality of equally spaced teeth 31 adapted to be engaged by a first pawl 32 pivotally carried on a pin 35 secured in one arm 36 of a lever 37 pivotally mounted on the shaft 21 at the right side of the ratchet (FIG. 3). A spring 40 connected between the pawl 32 and the lever 37 tends to bias the pawl toward engagement with the teeth of the ratchet. The lever 37 has a second arm 41 pivotally connected to one end of a rod 42. The rod 42, which extends through a hole in a bracket 45 secured by screws 46 to a portion of the framework 15 (FIGS. 2 and 4), has its other end pivotally connected to one arm 47 of a lever 50. The lever 50 is pivotally mounted on a stub shaft 51, secured in fixed position in the framework 15, between a collar 52 and a spacer member 55 on the stub shaft. A second arm 56 of the lever 50 carries a roller type follower 57 for engagement with a cam 60 fixed on a shaft 61 rotatably mounted in the framework 15. A compression type coil spring 62 carried on the rod 42 between a washer 65 slidably mounted on the rod and abutting the bracket 45 and a collar 66 fixed on the rod tends to bias the rod toward the left and turn the lever 50 clockwise, as viewed in FIG. 2, to maintain the follower 57 on the lever in engagement with the cam 60. The shaft 61 is rotated by spur gears 68 (FIG. 1) from the drive shaft 14 through a complete revolution during two rotations of the cylinder 11. The cam 60 has a low portion 67 which permits the spring 62 to move the rod 42 toward the left (FIG. 2) and turn the lever 50 clockwise and the lever 37 counterclockwise from their positions of FIG. 2 to reset the pawl 32 for engagement with a new tooth of the ratchet 30. Cam 60 also has a riser portion 70 which extends for approximately 180° from the low portion to a high point 71 and which acts through levers 37 and 50 and rod 42 to move the pawl at a constant speed through a one tooth indexing movement during one complete rotation of the cylinder. A descend portion 72 connecting the high point 71 and low portion 67 of the cam 60 again moves the rod toward the left to move the pawl to its reset position during the next rotation of the cylinder.

The teeth 31 of the ratchet 30 are also adapted to be acted on by a second pawl 75 pivotally carried on an arm of a lever 76 pivotally mounted on the shaft 21 at the left side of the ratchet (FIG. 3). The lever 76, which is identical to the lever 37, has a second arm pivotally connected by a rod 77 to one arm of a lever 80 pivotally mounted on the stub shaft 51 between the spacer member 55 and the framework 15 (FIG. 4). The lever 80, which is substantially identical to the lever 50, has a second arm having a roller type follower 81 for engagement with a cam 82 fixed on the shaft 61. The rod 77, which also extends through a hole in the bracket 45, carries a compression type coil spring 83 similar to the spring 62 on the rod 42, tending to bias the rod toward the left to turn the lever 80 clockwise and maintain the follower 81 in engagement with the cam 82. The cams 60 and 82, which are identical in configuration, are arranged on the shaft 61 so that as the riser portion of cam 60 moves pawl 32 through its indexing movement the pawl 75 is moving to reset position and as the riser portion of the cam 82 moves the pawl 75 through its indexing movement the pawl 32 is moving to reset position.

The pawls 32 and 75 are adapted to be selectively controlled so that both pawls may be activated to index the cam drum 20 in successive rotations of the cylinder 11 during a single rotation of the shaft 61 or one of the pawls may be activated to index the cam drum and the other pawl remain inactive during a single rotation of the shaft 61. The means for controlling the active and inactive positions of the pawls includes a camplate 85 for the pawl 32 mounted on the shaft 21 between the lever 37 and ratchet 30 and a camplate 86 for the pawl 75 mounted on the shaft 21 between the ratchet and the lever 76 (FIG. 3). The camplates 85 and 86 are each similarly provided with a high concentric surface 87 and a low surface 90 (FIGS. 5 and 6. The camplates are connected by a tie rod 91 adapted to be engaged by a forked end 92 of one arm 95 of a lever 96 pivoted on a stud 97 fixed in the framework (FIG. 2). A second arm 100 of the lever 96 is adapted to be engaged by a piston rod 101 of an air cylinder 102 connected through a solenoid operated type air valve 105 to a source of compressed air, indicated diagrammatically at 106 (FIG. 2). The operating coil of the air valve 105 is connected in an electrical circuit 107 with a normally open micro-switch 110 (FIG. 7) having an operating member 111. A spring 114 connected between the arm 95 and the framework 15 normally maintains the arm in engagement with a stop screw 115, adjustably carried in the framework, to position the camplates 85 and 86 as shown in FIGS. 2, 5 and 6. In this position of the camplates the high surfaces 87 thereof act to raise the pawls 32 and 75 out of engagement with the teeth of the ratchet 30 when the pawls are moved to their reset positions by the low portions of the cams 60 and 82 and the pawls then move idly between their resetting and indexing positions during subsequent rotations of the shaft 61 and cams. When a button or riser 112 on the chain 22 is advanced during an indexing movement of the chain to close the switch 110 the operating coil of the valve 105 is operated to open the valve. Air from the air source 106 then operates the cylinder 102 to turn the lever 96 clockwise and the camplates counterwise, as viewed in FIG. 2, to position the low surfaces 90 thereof to permit the pawls to engage a new tooth of the ratchet during the resetting movements and index the ratchet and cam drum during the indexing movements of the pawls.

As hereinbefore set forth, the chain 22 is given an indexing movement during each rotation of the cylinder 11 and the shaft 61 is rotated one complete revolution during a pair of rotations of the cylinder. When the pawls 32 and 75 are to be activated to successively index the cam drum 20 during each of a pair of rotations of the cylinder a riser 112 on the chain closes the switch 110 during one of a pair of indexing movements of the chain to position the camplates and activate one of the pawls for operation during one cylinder rotation and a riser 112 again closes the switch during the second of the pair of indexing movements of the chain to position the camplates to activate the other pawl for operation during the next rotation of the cylinder. On the other hand, when only one or the other of the pawls is to be activated to index the cam drum, a riser 112 is moved to close the switch 110 to position the camplates to activate one pawl during one of a pair of indexing movements of the chain and the camplates remain in their normal position to inactivate the other pawl during the second indexing movement of the chain.

It is believed to be obvious from the foregoing that the mechanism of the instant invention permits the cam drum of a circular knitting machine to be indexed in steps of equal extent during successive rotations of a pair of rotations of the needle cylinder of the machine or during one or the other of a pair of cylinder rotations. Furthermore, each indexing movement of the cam drum is at a constant speed and occurs during a complete rotation of the needle cylinder so that a cam provided on the cam drum to institute a machine function at a predetermined point in one cylinder rotation during one indexing movement of the cam drum may be duplicated on the cam drum to institute the same or other machine function at the same point in a subsequent rotation of the cylinder during a subsequent indexing movement of the cam drum.

It will be understood that the improvement specifically shown and described by which the above results are obtained can be changed and modified in various ways without departing from the invention herein disclosed.

I claim:

1. In a circular knitting machine having a rotatable needle cylinder, a first pattern means for controlling operation of said machine, means for advancing said first pattern means in pattern selecting steps during each rotation of said cylinder, and a second pattern means for controlling operation of said machine, wherein the improvement comprises means for advancing said second pattern means in steps of equal extent including a first indexing means for selectively advancing said second pattern means during one of a pair of sequential cylinder rotations, a second indexing means for selectively advancing said second pattern means during the other of said pair of said sequential cylinder rotations, means for alternately operating said first and second indexing means during said pair of sequential cylinder rotations, means for selectively activating and inactivating said first and second indexing means, means for controlling said activating and inactivating means to activate said first and second indexing means to successively advance said second pattern means in said one and other of said pair of sequential cylinder rotations and to selectively activate one of said indexing means to advance said second pattern means during a selected number of one of said pair and selectively inactivate the other of said indexing means during the other of said pair of cylinder rotations.

2. In a machine according to claim 1 in which said advancing means for said second pattern means includes a ratchet, said first and second indexing means each includes a pawl for engagement with said ratchet, and said means for activating and inactivating said first and second indexing means includes a camplate associated with each of said pawls.

3. In a machine according to claim 1 in which said operating means for said first and second indexing means includes a shaft rotatable through a complete revolution during a pair of rotations of said cylinder, a first cam on said shaft for operating said first indexing means, and a second cam on said shaft for operating said second indexing means.

4. In a machine according to claim 2 in which said camplates are movable between first positions to inactivate said pawls and second positions to activate said pawls, and there is common means for moving said camplates between said first and second positions.

5. In a machine according to claim 4 in which said common means comprises a lever, and said control means for said activating and inactivating means includes first means for operating said common means to move said camplates to said first positions, and second means for operating said common means to move said camplates to said second positions.

6. In a machine according to claim 5 in which said first operating means for said common means comprises a spring, and there is stop means for controlling the movement of said common means by said spring to move said camplates to said first positions.

7. In a machine according to claim 5 in which said second operating means for said common means comprises an air cylinder, and there is means operated by said first pattern means for controlling the operation of said common means by said air cylinder to move said camplates to said second positions.

8. In a machine according to claim 3 in which said first and second cams each include a low portion and a riser portion, and said cams are arranged on said shaft so that the riser portions of said cams operate said first indexing means in a first direction to advance said second pattern means during said one of said pair of cylinder rotations and said second indexing means in said first direction to advance said second pattern means in said other of said pair of cylinder rotations, and said low portions of said cams control the movement of said first indexing means in a second direction to reset said first indexing means in said other of said pair of cylinder rotations and said second indexing means in said second direction to reset said second indexing means in said one of said pair of cylinder rotations.

References Cited

UNITED STATES PATENTS 3,289,437  12/1966  Mahler _____ 66—50

FOREIGN PATENTS 1,094,924  12/1967  Great Britain _____ 66—154

WILLIAM CARTER REYNOLDS, Primary Examiner